United States Patent
Favre

[15] 3,644,808
[45] Feb. 22, 1972

[54] MEANS FOR PROTECTING ELECTRONIC COMMUTATION MOTOR FROM ACCIDENTAL OVERLOAD

[72] Inventor: Robert Favre, 36 Rue de Servan 1000, Lausanne, Switzerland

[22] Filed: Oct. 26, 1970

[21] Appl. No.: 83,754

Related U.S. Application Data

[63] Continuation-in-part of Ser. No. 641,566, May 26, 1967, abandoned.

[30] Foreign Application Priority Data

May 27, 1966 Switzerland ..........................7710/66
May 27, 1966 Switzerland ..........................7711/66

[52] U.S. Cl. ...........................................................318/138
[51] Int. Cl. .........................................................H02k 29/00
[58] Field of Search ..........................................318/138, 254

[56] References Cited

UNITED STATES PATENTS

| | | | |
|---|---|---|---|
| 3,290,572 | 12/1966 | Hartmann et al. | 318/138 |
| 3,302,083 | 1/1967 | Tanaka et al. | 318/138 |
| 3,436,631 | 4/1969 | Favre | 318/138 |

*Primary Examiner*—Gene Z. Rubinson
*Attorney*—Robert E. Burns and Emmanuel J. Lobato

[57] ABSTRACT

An induction motor fed from a DC source is commutated by a transistor bridge controlled by a pilot voltage. A voltage proportional to motor current is fed back to the control circuit to cut off the respective commutation elements when the motor current becomes excessive. Auxiliary transistorized circuits protect the commutating elements against overload by induced reaction current and provide a braking current for the motor when the supply current is abruptly cut off. Diodes associated with induction coils protect the commutation circuit against reversal of the nominal polarity of the commutating transistors. The effective number of ampere-turns in the motor winding is increased during starting and when running at low speed to protect the commutating elements from overload while providing high torque.

17 Claims, 5 Drawing Figures

MEANS FOR PROTECTING ELECTRONIC COMMUTATION MOTOR FROM ACCIDENTAL OVERLOAD

This application is a continuation-in-part of copending application Ser. No. 641,566, filed May 26, 1967 now abandoned.

The present invention relates to electronic commutation motors operated from a direct current power supply and particularly to the protection of the commutating circuits of such motors against accidental overload.

An electronic commutation motor usually comprises at least one motor winding to which current is supplied from a direct current source through a commutation circuit comprising, for example, power transistors.

Electronic commutation motors can, under certain circumstances restore a part of the kinetic energy of the rotor to the terminals of the winding in the form of electricity. This reversal of power feed, usually of an accidental character, can cause the damaging and even the destruction of the commutation elements by reason of voltage or current overload or still yet by reason of the inversion of their normal polarity. These phenomena are referred to as dynamic overloads.

For example in the case of an electronic commutation motor of the induction type, the restoration of energy of the rotor to the stator winding results essentially from:

a. a reaction current which is too high;
b. an abrupt shutting off of the feed current, or
c. an accidental dephasing of the commutation.

According to one characteristic of the invention, protective means against overload of a dynamic origin comprises means for momentarily blocking a commutation element during the overload of such element by a current of dynamic origin, means for cresting all voltages of dynamic origin causing unwanted inversion of the polarity of a commutation element and means for limiting the amplitude of all unwanted overload of dynamic origin.

It is also possible to use the induction of the motor as a means for limiting an accidental starting or overload current, particularly in an induction motor with electronic commutation, the peak current of which is limited to an amplitude near the nominal maximum current and the slip frequency of which is maintained at an optimum value.

According to another characteristic of the invention there is provided, in an induction motor of the above mentioned type, means for maintaining the inductance of the circuit comprising the motor and the commutation elements between given limits regardless of the frequency of the commutation.

The maintenance of this impedance in proportion to the frequency of the commutations is obtained preferably but not exclusively by varying the apparent number of active stator coils of the motor in such a way that the torque is relatively higher when the rotational speed is less.

It should be noted that the variation of the number of active driving coils can take place by means of a transformer coupled between the motor and the commutation elements whereby the "apparent number" of active driving coils is varied although the actual number of driving coils of the motor remains constant. In this configuration it is the number of primary coils of the transformer which is varied as a function of the commutation frequency. This variation can be made in a continuous manner but it is simpler to effect it by stages. The relation between the extreme frequencies of a stage is in practice of the order of two to three.

It should be understood that the maintenance of the inductance between judicious limits implies that the useful frequency of the commutation is never zero, a condition which is easy to fulfill.

It is evidently possible to insure the maintenance of the inductance value by additional windings independent of the motor or of an adapting transformer. This technique would not permit obtaining a torque that is relatively higher as the speed decreases. It could however permit a continuous adaptation by the known phenomenon of magnetic saturation.

In my U.S. Pat. No. 3,309,592 there has been described an induction motor with electronic commutation, the peak current of which is substantially equal to the maximum nominal current so as to protect the semiconductor type commutation elements. In my U.S. Pat. No. 3,436,631, there has been described a motor of the same type in which means are provided for insuring the automatic optimization of the slip frequency in such a way that the starting current occurs under a very low frequency (3 to 6 Hz.).

The limitation of the starting current and of the speed to a value near the maximum nominal current has the disadvantage of limiting the starting torque to a value also near the maximum nominal torque even though there is often required a starting torque which is much higher than the nominal operating torque. However, the modification of the number of coils of the inductive winding of the motor makes it possible to insure, during starting and at low speeds, a torque which is very high by increasing the effective number of inductive ampere-turns.

In a preferred embodiment, commutation takes place according to a series-parallel connection of the windings. Since the starting current is limited in intensity, it is desirable to make it operate in a maximum number of coils as long as the self-induction parasites are not objectionable. This is avoided by the fact that the slip frequency of the motor is constantly optimized, that is to say, that in starting it is in the vicinity of 3 to 6 Hz.

It is known that the torque of an induction motor is substantially proportional to the square of the current (or the ampere-turns). With the imposed starting current it is possible to quadruple the corresponding torque under low speed by series connection of two portions of the motor winding. Transition to a parallel coupling is required only when the parasitic effect is a serious problem to the establishment of the nominal current owing to an increase in frequency.

It is understood that the transition from series connection to parallel connection can take place automatically by a device controlled as a function of the speed. Such devices are well known to those skilled in this art.

Without resorting to series-parallel transition, inductance can be varied by adding or removing a certain number of coils. However, this expedient has the drawback of poor use of the copper owing to the unused coils. Finally, it is possible to combine the series-parallel transition with a variation in the number of pairs of poles. For example, the motor may operate with four poles in starting and at low speeds, the winding then being commuted to a two-pole motor at high speeds.

It will be noted that the torque of such a motor during starting and at low speeds is dependent on the limitation of the peak current to a value near the maximum nominal current of the commutation elements and the fact that the commutation frequency is very low.

The objects, advantages and characteristics of the invention will be more fully understood from the following description in conjunction with the accompanying drawings which illustrate by way of example preferred embodiments of the invention.

Figure 1:
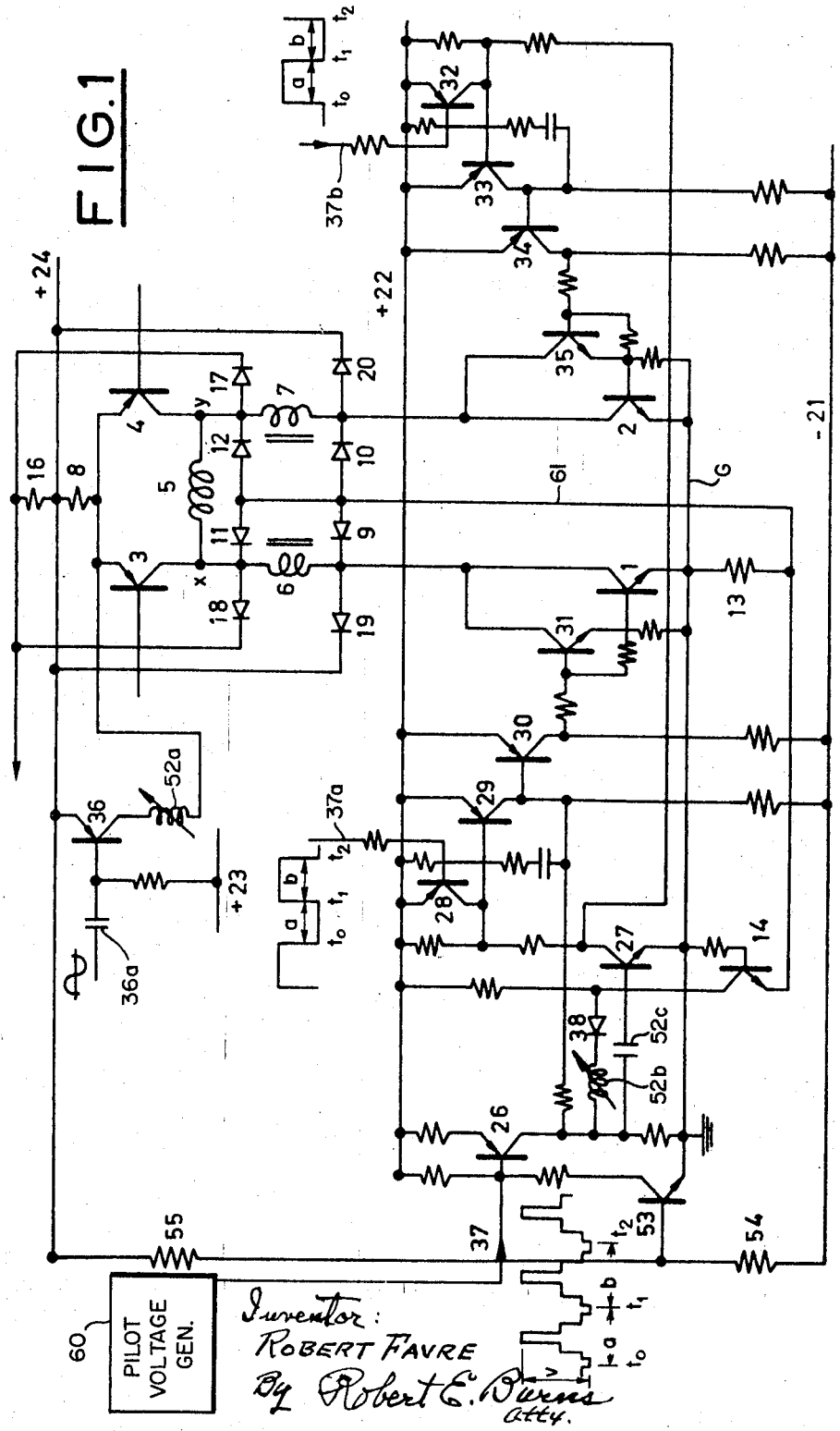
FIGS. 1 and 2 are together a circuit diagram showing schematically a motor commutation circuit having protective means in accordance with the present invention.

With reference to FIG. 1, transistors 1, 2, 3 and 4 constitute a transistor bridge providing commutation for the driving winding 5 of an induction motor having terminals x and y.

When transistors 1 and 4 are conducting, while transistors 2 and 3 are nonconducting, the motor winding 5 is connected between ground G and the positive terminal +24 of a direct current power supply so that current flows through the motor winding 5 in one direction. When transistors 2 and 3 are conducting, while transistors 1 and 4 are nonconducting, the motor winding is likewise connected between ground and the positive terminal +24 but with the current flowing through the winding in the opposite direction. The motor winding 5 is thereby supplied with alternating current from a direct current source. Induction coils 6 and 7 connected respectively in series between the transistors 1 and 2 and the motor winding 5 reduce the rate of increase in the current and contribute to its filtering. A parametric resistor 8 is connected in series between the positive terminal +24 of the power supply and the emitters of the transistors 3 and 4.

The transistors 1 and 2 are controlled by the circuitry illustrated in FIG. 1. A "pilot" voltage of a wave form corresponding to that of the desired motor current is supplied by a suitable pilot voltage generator 60 as described, for example, in Favre U.S. Pat. No. 3,436,631. In the case of an induction motor, the waveform may be approximately sinusoidal as shown. The pilot voltage is fed through a lead 37 to the base of an NPN-transistor 26 by which it is inverted and then applied to the base of a transistor 27 through a circuit comprising a diode 38 and the secondary 52b of a transformer, the primary 52a of which is connected in series with the parametric resistor 8 in the emitter-collector circuit of a transistor 36. A high-frequency alternating current is supplied to the base of the transistor 36 from a suitable HF source through a suitable condenser 36a so as to energize the transistor 36 periodically and thereby transmit to the secondary transformer winding 52b a voltage which is proportional to the voltage drop across the resistor 8 and hence proportional to the current through the motor winding 5. A condenser 52c decouples the high-frequency voltage detected by the diode 38. The voltage which is thus supplied to the base of the transistor 27 and is proportional to the current through the motor winding 5 is in opposition to the voltage applied by the transistor 26. The voltage applied to the base of the transistor 27 is thus the wave form of the pilot voltage from which is subtracted a "parametric" voltage proportional to the motor current.

The transistor 27 controls the commutating transistor 1 through the chain of cascade connected transistors 29, 30 and 31 and also controls the commutating transistor 2 through the chain of transistors 33, 34 and 35. Alternate operation of the transistors 1 and 2 is provided by locking transistors 28 and 32 controlling transistors 29 and 33 respectively. The transistors 28 and 32 are controlled by square-wave voltages applied respectively through input leads 37a and 37b from a suitable square-wave generator forming part of, or synchronized with, the pilot voltage generator 60. The wave forms applied respectively to transistors 28 and 32 are 180° out of phase relative to one another so that when transistor 28 is conducting, transistor 32 is nonconducting and alternatively, when transistor 32 is conducting, transistor 28 is blocked. For example, during a period a between $t_0$ and $t_1$, a positive pulse is applied to the transistor 32 so as to render the transistor conductive and thereby block the cascade 33, 34, 35 and 2. The transistor 28 is nonconducting so that the cascade 29, 30, 31 and 1 is conductive and is fed with the half-wave a of the pilot voltage supplied through the lead 37 and transistors 26 and 27. During the next half-wave b between the times $t_1$ and $t_2$, a positive rectangular pulse is applied to the transistor 28 so that it becomes conductive and blocks the cascade 29, 30, 31 and 1 while transistor 32 is nonconductive and hence the cascade 33, 34, 35 and 2 is conductive so as to transmit the half-wave b of the pilot voltage applied through the lead 37 and transistors 26 and 27.

During the half-wave a when the transistor 28 is nonconducting and the transistor 32 is conducting so as to block the transistor cascade 33, 34, 35 and 2, the current in the motor winding 5 supplied through transistors 27, 29, 30, 31 and 1 increases in accordance with the wave form of the pilot voltage until the parametric voltage which is generated in the transistor secondary 52b and which is proportional to the motor current, as explained above, is substantially equal to but opposite the instantaneous value of the pilot voltage. The transistor 27 and consequently transistor 1 thereupon become nonconductive while the motor current by self-induction flows through the diode 19 until its value and the corresponding value of the parametric voltage across resistor 8 decrease sufficiently for the transistor 27 to again become conductive. The motor current thus has a shape modulated by that of the pilot voltage and prevented from becoming excessive by the phase-cutting effected by feeding back to the control transistor circuit a voltage proportional to the motor current.

During the following half-wave current b, transistor 28 becomes conductive and thereby blocks the transistor cascade 29, 30, 31 and 1 while transistor 32 becomes nonconductive so as to unblock the transistor cascade 33, 34, 35 and 2 for the transmission of a motor current in the reverse direction under control of the transistor 27 in like manner.

Power for the transistors 26 to 35 is provided from a suitable direct-current power supply having a ground lead G, a positive voltage line +22 and a negative voltage line −21 which has a voltage a few volts below ground.

Figure 2:
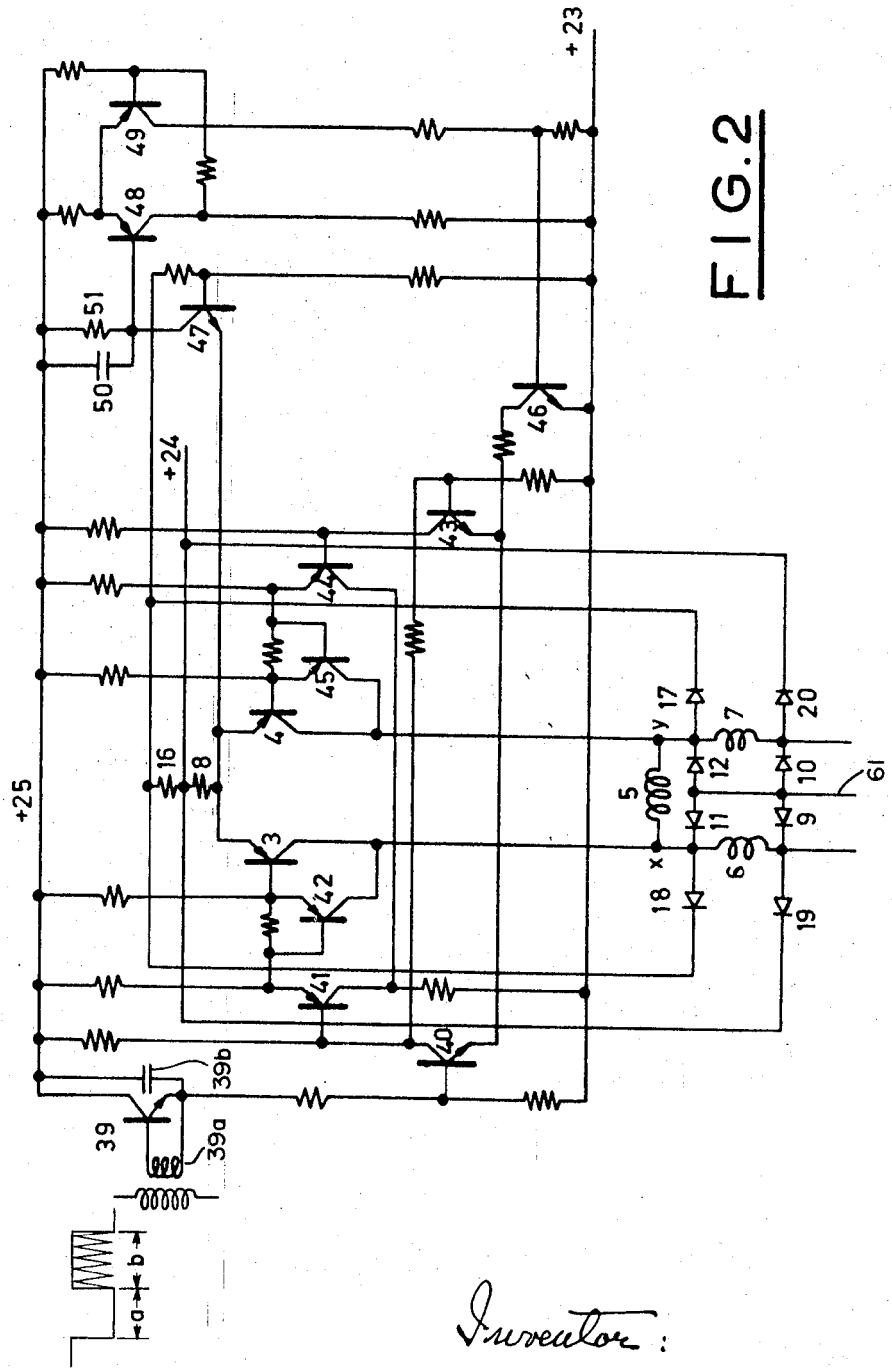

A circuit for controlling the commutation of transistors 3 and 4 is illustrated schematically in FIG. 2. A transistor 39 controls the transistor 3 through transistors 40, 41 and 42 connected in cascade and controls the transistor 4 through transistors 43, 44 and 45 connected in cascade. The transistor 39 is controlled by the output voltage of the secondary of a transformer 39a, the primary of which is supplied with a control voltage having a square wave envelope. During a half-wave a, the transistor 39 is nonconducting so that the transistor cascade 43, 44, 45 and 4 is conductive. During the half-wave b, a high-frequency signal with a rectangular envelope is fed inductively to the base of the transistor 39 so as to render it conductive at the same time as transistor 28 (FIG. 1). The transistor cascade 40, 41, 42 and 3 is thereby rendered conductive while the transistors 43, 44, 45 and 4 are nonconductive. A capacitor 39b decouples the transistor 39. The control voltage for the transistor 39 is supplied from the same voltage source that supplies the control voltage for the transistors 28 and 32 or from a synchronized voltage source so that the transistors 3 and 4 are operated in synchronism with transistors 1 and 2. Circuitry for distribution of control voltages is shown, for example, in the Favre U.S. Pat. No. 3,436,631. Power for the transistors 39 to 45 is supplied from lead +23 the voltage of which is about 6 or 7 volts below that of the line +24 and a line +25 the voltage of which is about 6 or 7 above that of the line +24.

Means are provided for protecting the commutating transistors 3 and 4 from overload. As described above, a small parametric resistor 8 is connected between the transistors 3 and 4 and the power supply line +24. The voltage generated across the resistor 8 is applied to the emitter of a safety transistor 47 which becomes conductive when this voltage and hence the motor current exceeds a selected limit value. An amplitude-discriminating circuit comprising transistors 48 and 49 is thereupon switched so as to make transistor 48 conductive and transistor 49 nonconductive. This results in blocking a transistor 46 and thereby blocking whichever of the commutation transistors 3 or 4 is engaged in the commutation. The duration of the blocking is controlled by the time constant of the circuit determined by a capacitor 50 and resistor 51.

In normal operation, the normal driving current does not reach a value sufficient to cause operation of the protective circuit comprising transistors 46–49. However, when the reaction current is too high, which is often the case when running without load or under small load, the voltage induced at the terminals x and y of the winding 5 reverses before the end of the commutation period. The voltage induced by dynamic effect is short circuited, for example through transistor 3 and the diode 17 or, following the reversal, through the transistor 4 and diode 18. This short circuit current can cause destruction of the commutation transistors in the absence of the safety device comprising the transistors 46–49.

The efficiency of the protective circuit is further improved by a small resistor 16 through which short circuit current of dynamic origin passes and which is coupled to the base of the transistor 47 so as to precipitate the conduction of the latter and therefore the nonconductivity of the respective commutation transistor 3 or 4 in the event of excessive short circuit current.

It will be seen that opposite ends of the auxiliary induction coils 6 and 7 are connected by diodes 9, 10, 11 and 12 to a line 61 which is connected through a resistance 13 to ground. Ends of the coils 6 and 7 which are remote from the motor winding are connected through diodes 19 and 20 respectively with the power supply line +24 while the opposite ends of the coils are connected through diodes 18 and 17 respectively and the resistor 16 with the power supply line +24. The diodes 9, 10, 19 and 20 limit the self-induction voltages on the smoothing coils 6 and 7. Moreover, the diodes 19 and 20 are also conductive during "normal" operation if during a commutation period, for example during the half-wave $a$ of the control voltage when power transistors 1 and 4 are conductive, transistor 27 is blocked by the feedback voltage transmitted through the transformer 52a, 52b as described above. In this event, the transistor cascade 29, 30, 31 and 1 is blocked and hence the feeding current for the motor coil 5 is cut off. However, the inductive current that continues to flow through the coil 5 in the same direction has a closed circuit comprising the motor coil 5, smoothing coil 6, diode 19, power supply line +24, resistance 8 and transistor 4. If this inductive current flowing through the resistance 8 decreases below a given value, the transistor 27 and hence the transistor 1 will again become conductive. During the other half-wave, the motor circuit can be closed in like manner through coil 7 and diode 20.

The other diodes are conductive in the event of abnormal conditions in the operation of the motor.

Referring again to FIG. 1, means are provided for protecting the circuit in the event that one of the wave form controlling transistors 1 or 2 is conductive when both of the transistors 3 and 4 are blocked by the safety device described above. In this event, the short circuit current induced in the winding 5 does not pass through the parametric resistor 8 and hence no feedback voltage is transmitted through the transformer 52a, 52b to the control transistor 27. Assuming that both of the transistors 3 and 4 are nonconducting and that one of the transistors 1 and 2 is conducting while the other is nonconducting, voltage induced in the motor winding 5 can flow through at least one of the diodes 9, 10, 11 or 12 to the connecting line 61 and through the small auxiliary resistance 13 and whichever of transistors 1 or 2 is conducting back to the motor winding. To protect the transistors 1 and 2 from damage by such short circuit current, the base emitter circuit of a transistor 14 is connected across the resistor 13 so that the transistor 14 becomes conductive in the event of excessive current through the resistor. The collector of the transistor 14 is connected to the base of the control transistor 27 so as to connect the base of the latter to ground and thereby block the transistor 27 when the transistor 14 becomes conducting. Through the circuitry described above, the blocking of transistor 27 results in the blocking of transistors 1 and 2 thereby protecting them from the short circuit current. The timing of the momentary blocking provided by the transistor 14 is determined by the time constant of the circuit.

A further form of dynamic overload occurs when the driving or control current of a motor running at high speed is abruptly interrupted. In such event the kinetic energy of the rotor is converted to electric energy which is fed back to the power supply leads through cresting diodes and can dangerously increase the voltage to which the commutating transistors are subjected.

Protection against such induced voltages is provided by circuitry shown in FIG. 1 comprising a transistor 53 and associated resistances 54 and 55. The emitter of the transistor 53 is connected to ground while the resistances 54 and 55 constitute a voltage divider connecting the base of the transistor 53 between the negative power supply lead −21 and the positive power supply lead +24. The collector of the transistor 53 is connected through a resistance to the base of the transistor 26 which, as described above, in part controls the transistor 27. The voltage of the lead −21 is negative by a few volts relative to ground so that the transistor 53 is normally nonconductive. If, however, it is desired to stop the motor while running at high speed, for example by switching off the control voltages applied through leads 37, 37a and 37b, the kinetic energy of the rotor transformed into electrical energy may result in an induced voltage applied to the lead +24. If the voltage of the lead +24 exceeds an admissible value, transistor 53 becomes conductive and applies a continuous voltage on the transistor 26 and therefore on transistor 27 so that a continuous current is supplied through whichever diagonal of the transistor bridge is conductive at the time the control voltage was switched off. For example current may flow from the terminal $x$ of the motor winding 5 through the inductance coil 6, the transistor 1, the resistor 13 and the diode 12 to the terminal $y$ of the motor winding. This continuous current produces a braking action on the motor while limiting the overvoltage applied to the lead +24.

In summary, the dynamic voltages generated by the feedback of the kinetic energy of the rotor to the stator winding can produce the following effects:

1. An overload by the short-circuit current of the commutating transistors 3 and 4. The transistors are protected from this effect by a circuit comprising the auxiliary transistors 46, 47, 48 and 49 as well as the resistances 8 and 16 (FIG. 2).

2. A dangerous reversal of the nominal polarity of the commutating transistors. Protection from this effect is afforded by the voltage-limiting diodes placed on either side of the auxiliary induction coils 6 and 7 (FIGS. 1 and 2). 3. Overload by the short circuit current of the current-shaping transistors 1 and 2. Protection from this effect is provided by the transistor 14 and associated resistance 13 (FIG. 1).

4. Excess voltage resulting from the feedback of the kinetic energy of the rotor when the feed current is cut off. Protection from this effect is provided by applying a braking current to the motor by means of the transistor 53 responsive to changes in voltage applied to the voltage divider comprising resistances 54 and 55 across the feed line for the motor winding. This has the double effect of absorbing the kinetic energy of the rotor and of limiting excess voltage by the current used (FIG. 1).

Figure 3:
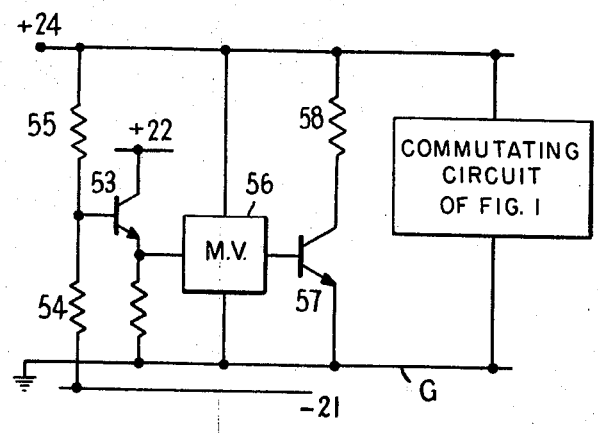
FIG. 3 is a circuit diagram illustrating schematically a modification of a portion of the circuit of FIG. 1.

An alternative solution for protecting the circuit against dynamic overload created by the kinetic energy of the motor when the pilot voltage is abruptly reduced or cut off is illustrated in FIG. 3 which represents a modification of a portion of FIG. 1, corresponding components being designated by the same reference numerals. As in FIG. 1, the transistor 53 is normally nonconductive. However, when the pilot voltage is suddenly cut off while the motor is running at high speeds, the motor acts as a generator feeding current into the voltage source represented by ground and the supply line +24. This results in raising the voltage of the supply line +24, causing the transistor 53 to become conductive so as to switch on a bistable multivibrator 56 and thereby make transistor 57 conductive. The transistor 57 is connected in series with a coil 58 between the two poles of the voltage source so as to produce a current "bypass" for rapidly decreasing the overvoltage on the source. The coil 58 which may, for example, have a resistance of 10 ohms and a power rating of 100 watts, dissipates the energy.

Figure 4:
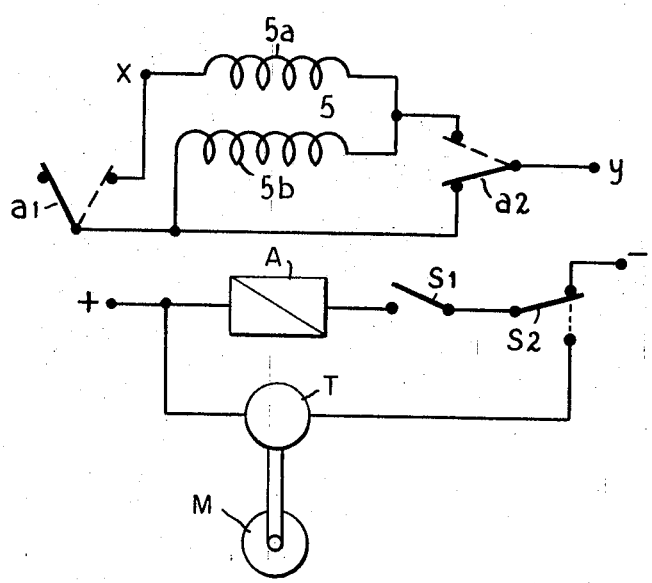
FIG. 4 illustrates schematically means for connecting two parts of the motor winding selectively in series or in parallel in order to maintain the inductance of the circuit within given limits regardless of the commutation frequency.
Figure 5:
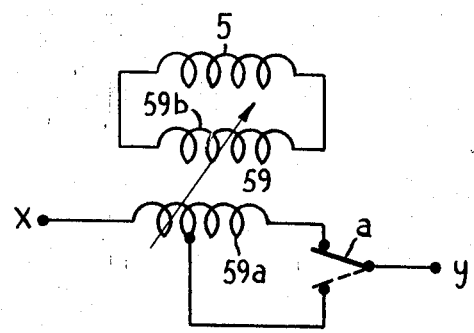
FIG. 5 illustrates schematically the feeding of the motor winding through a transformer having a variable transformer ratio.

FIGS. 4 and 5 disclose means for protecting the semiconductive elements of the electronic control circuits during starting and when running at low speeds, while at the same time providing motor torque which is higher than the torque produced under normal operation at normal operating speeds. When the rotating field of a usual induction motor is set in motion, as long as the rotor does not turn or turns very slowly, the field passes through the rotor at high speeds and it is necessary to insure that excessive current is not fed to the secondary and primary circuits by the high induced electromotive forces thereby generated. Excessive current in the field windings loads the circuits with undesirable surges of current while excessive rotor current resulting from the slip results in the production of insufficient torque.

These difficulties are overcome in accordance with the present invention by holding the frequency of the starting current at a low value and by providing means for increasing the number of ampere-turns of the field winding when starting and running at low speed. In the embodiment illustrated in FIG. 4 the number of ampere-turns is varied by means of two motor windings which are connected in series with one another during starting and when the motor is running at low speeds and are connected in parallel with one another when the motor is running at normal operating speed. The motor driving coil 5, the terminals $x$ and $y$ of which are connected in a commutating circuit according to FIGS. 1 and 2, consists of two windings 5$a$ and 5$b$. By means of contacts $a1$ and $a2$ of a relay A, the windings 5$a$ and 5$b$ can be connected either in series with one another (when the movable contacts are in the position shown in solid lines) or in parallel with one another (when the movable contacts are in broken line position). The relay A can be switched either by hand by means of a switch S1 or automatically, for example by a threshold voltage produced by a tachometer generator T coupled to the rotor of the motor M, if the switch S2 is changed to broken line position.

During the starting period, the two windings 5$a$ and 5$b$ of the driving coil 5 of the motor are connected in series giving an ampere-turn value of $Ni$ where N is the number of turns in both windings and $i$ is the current value which is nearly the maximum current allowed for the power transistors 1–4 or other semiconductor switching devices in the control circuit. When the normal operating speed has been reached, the relay A switches the relay contacts $a1$ and $a2$ into the broken line positions shown in FIG. 4 so that the two windings 5$a$ and 5$b$ of the motor driving coil 5 are now connected in parallel with one another, giving an ampere-turn value of $Ni/2$.

In order to avoid an electrical asymmetry in parallel connection, the two field windings 5$a$ and 5$b$ are preferably wound of two conductor wires, one of the conductors constituting the winding 5$a$ and the other the winding 5$b$.

In the embodiment illustrated in FIG. 5 the motor driving coil 5 is connected in the secondary circuit of a transformer 59, the primary 59$a$ of which has terminals $x$ and $y$ connected in the commutating circuit of FIGS. 1 and 2 in the same manner as coil 5 in those figures. Hence, the current switched by the power transistors 1–4 flows through the primary winding 59$a$ of the transformer 59 while the secondary 59$b$ of the transformer feeds the motor coil 5. The inductive feeding of the motor coil is often very advantageous because of the galvanic separation between the control circuit and the motor circuit.

In this embodiment the number of ampere-turns is modified by modifying the ratio of the number of turns in the primary and secondary of the transformer 59. As illustrated by way of example in the drawings, the transformer ratio is varied by selectively connecting the terminal $y$ to one of a plurality of taps of the primary winding of the transformer by means of contact $a$ of a relay A which corresponds to the relay A shown in FIG. 4 and is operable in like manner.

During starting and when the motor is operating at low speed, the contact of the relay A is in the solid line position so that all turns of the primary winding 59$a$ of the transformer are in circuit in series with one another. When normal operating speed is reached, the movable contact of the relay A is moved to the broken line position so as to reduce the number of turns in the primary winding of the transformer 59. In this way, an alteration of the number of ampere-turns in the field winding of the motor is obtained indirectly by modifying the number of primary windings of the transformer in such a way that the motor starting torque can be maintained at an optimum level during starting and when the motor is operating at low speed.

The transformer 59 can, if desired, have more than the two taps shown or may be provided with stepwise alteration of the number of turns.

Furthermore, it is possible to combine the series-parallel commutations of the field windings with known means for changing the number of poles to control the speed of three-phase asynchronous motors. Thus, the motor can be started or run at low speed with series connection of the field windings and with four poles and can be run at normal operating speed with the field windings connected in parallel and with two poles. The contact assembly for switching the field windings from series connection to parallel connection can conveniently also switch the number of poles of the stator windings.

As the motor torque is proportional to the square of the number of ampere-turns, the starting torque with series connection of the field windings can be four times as great as the normal running torque with the windings connected in parallel. This is due to the fact that full motor current is assured by the commutation circuitry. As the slip frequency is automatically held in a range between 3 Hz. and 6 Hz. during starting, full utilization of the maximum number of winding turns can be made as long as the mutual induction permits. The parallel connection becomes necessary when at high frequencies or high rotational speed the mutual induction becomes so strong in the stator winding that the motor current in the series circuit does not reach its nominal value.

It will thus be seen that in accordance with one feature of the present invention the number of ampere-turns is increased during starting or operation at low speeds while the inductance of the motor including the load circuit which must be switched by the commutating elements is maintained approximately constant. When the number of turns N is increased during starting or at low speeds, that means that if the frequency $\omega$ is reduced (in order to maintain the motor torque constant) the inductivity L is increased while the inductive reactance $\omega L$ remains constant. When there is stepwise alteration of the number of turns of the primary winding of the transformer, the ratio of the extreme frequencies $\omega$ of a step is selected so as to be of the order of 2 to 3.

While preferred embodiments of the invention have been herein illustrated and described by way of example, it will be understood that modifications may be made. Although the circuitry shown in FIGS. 4 and 5 has been described with reference to the commutation circuitry illustrated in FIGS. 1 and 2, it will be understood that it is also applicable to other commutating circuitry, for example the modified circuitry of FIG. 3.

What I claim and desire to secure by Letters Patent is:

1. In a control circuit for electronically commutating a motor having a motor winding, direct current supply means, switching means including switching transistors for connecting said motor winding cyclically with said direct current supply means with alternating polarity to drive said motor, means controlling the switching of said switching means including means supplying a wave form pilot signal and means responsive to current in said motor winding for modifying said pilot signal, a reactance connected in series with said motor winding, means responsive to the voltage drop across said reactance and including an amplitude-discriminating circuit for blocking said switching means to open the motor winding circuit in the event said voltage drop is greater than normal value, and voltage-limiting resistance means for shunting said motor winding in event of excessive voltage induced in said winding.

2. A control circuit according to claim 1, in which said means responsive to voltage drop across said reactance comprises a transistor and in which a second reactance connected in series with said motor winding is connected with said transistor to increase its switching rate in the event of excessive current through said second reactance.

3. A control circuit according to claim 1, in which said means responsive to voltage drop across said reactance for blocking said switching means comprises timing circuit means for limiting the duration of such blocking.

4. A control circuit according to claim 1, in which said means responsive to current in said motor winding for modifying said pilot signal comprises a resistance connected in series with said motor winding and means for applying in opposition to said pilot signal a voltage proportional to the voltage drop across said resistance.

5. A control circuit according to claim 1, in which said switching transistors comprise a four transistor bridge, further comprising protective means for momentarily blocking transistors of said bridge in the event of a dynamic overcharge in said motor winding, said protective means comprising a transistor for blocking said controlling means and a resistance in the emitter circuit of one of said bridge transistors and controlling said blocking transistor.

6. A control circuit according to claim 1, in which said direct current supply means comprises a plurality of conductors normally maintained at different potentials, further comprising means for protecting said control circuit and motor from dynamic overcharge in the event the current supply is interrupted when the motor is running at high speed, said protecting means comprising two resistances connected in series between two said conductors and a normally nonconducting transistor having its base connected between said transistors and means controlled by said last mentioned transistor for dissipating said overcharge.

7. A control circuit according to claim 1, in which said direct current supply means comprises a plurality of conductors maintained at different potentials, and in which said switching transistors comprise a four transistor bridge, further comprising an inductance connected in series between each of two alternately conductive transistors and respective terminals of said winding and voltage limiting diodes connected between opposite ends of each said inductance and conductors of said supply means.

8. A control circuit according to claim 1, further comprising means for altering the effective number of ampere-turns of said motor winding to provide higher torque during starting and when the motor is running at low speeds with the current switched by said transistors approximately equal to normal running current.

9. A control circuit according to claim 8, in which said motor winding comprises two winding portions and in which said means for altering the effective number of ampere-turns of said motor winding comprises means for connecting said winding portion in series with one another during starting and when the motor is running at low speeds and for connecting said winding portions in parallel with one another when said motor is running at normal speed.

10. A control circuit according to claim 9, in which said connecting means is responsive to the speed of the motor.

11. A control circuit according to claim 9, in which said two winding portions are wound together of two conductor wire to provide symmetry of said winding portions both when connected in series and when connected in parallel.

12. A control circuit according to claim 8, in which said means for altering the effective number of ampere-turns of said motor winding comprises a transformer having a primary and a secondary, said switching means being connected with said primary to control flow of current therethrough and said secondary feeding said motor winding, said transformer comprising means for varying its transformer ratio.

13. A control circuit according to claim 12, in which said means for varying the ratio of said transformer comprises means for varying the effective number of turns of said primary.

14. In a control circuit for electronically commutating a motor having a motor winding, direct current supply means, switching means for connecting said motor winding cyclically with said direct current supply means with alternating polarity to drive said motor, said switching means comprising a four transistor bridge, means cyclically controlling the switching of the transistors of said bridge to connect said motor winding alternately across diagonals of said bridge, said controlling means including means supplying a wave form pilot signal for controlling the switching of said transistors, and protective means for momentarily blocking transistors of said bridge in the event of a dynamic overcharge in said motor winding, said protective means comprising a transistor for blocking said controlling means and a resistance in emitter circuit of one of said bridge transistors and controlling said blocking transistor.

15. In a control circuit for electronically commutating a motor having a motor winding, direct current supply means comprising a plurality of conductors normally maintained at different potentials, switching means including switching transistors for connecting said motor winding cyclically between two said conductors and alternately reversing the connections to produce current flow in said winding alternately in opposite directions, means controlling the switching of said switching means comprising means supplying a wave form pilot signal and means responsive to said pilot signal controlling the conductivity of said respective switching transistors, and means for protecting said control circuit and motor from dynamic overcharge in the event the current supply is interrupted when the motor is running at high speed, said protecting means comprising two resistances connected in series between two said conductors and a normally nonconducting transistor having its base connected between said resistances and means controlled by said last mentioned transistor for dissipating said overcharge.

16. A control circuit according to claim 15, in which said means for dissipating said overcharge comprises a resistor and means controlled by said last-mentioned transistor for connecting said resistor between the conductors of said direct current supply means supplying current to said motor winding.

17. In a control circuit for electronically commutating a motor having a motor winding, direct current supply means comprising a plurality of conductors maintained at different potentials, switching means for connecting said motor winding with said supply means comprising first and second switching transistors having collector-emitter circuits connected respectively between one said conductor and opposite terminals of said winding and third and fourth transistors having collector-emitter circuits connected respectively between a second said conductor and the opposite terminals of said winding, means for cyclically controlling the switching of said switching means comprising means supplying a wave form voltage pilot signal and means for rendering said first and fourth switching transistors conductive and said second and third switching transistors nonconductive during one half wave of said pilot signal and for rendering said first and fourth switching transistors nonconductive and said second and third switching transistors conductive during the succeeding half-wave of said pilot signal to produce current flow through said winding alternately in opposite directions, and circuit protecting means comprising an inductance connected in series between each of said first and second switching transistors and respective terminals of said winding and voltage-limiting diodes connected between opposite ends of each said inductance and said conductors of said supply means.

* * * * *